United States Patent
Narasimha et al.

(10) Patent No.: US 8,244,250 B2
(45) Date of Patent: Aug. 14, 2012

(54) METHOD FOR ALLOCATING A TEMPORARY RESOURCE REQUEST IDENTIFIER FOR ACCESSING A TARGET BASE STATION

(75) Inventors: Murali Narasimha, Lake Zurich, IL (US); Ivan N. Vukovic, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 560 days.

(21) Appl. No.: 12/243,590

(22) Filed: Oct. 1, 2008

(65) Prior Publication Data
US 2009/0088161 A1 Apr. 2, 2009

Related U.S. Application Data

(60) Provisional application No. 60/976,644, filed on Oct. 1, 2007.

(51) Int. Cl.
*H04W 36/00* (2009.01)
*H04W 72/00* (2009.01)
*H04W 4/00* (2009.01)

(52) U.S. Cl. ........ 455/436; 455/438; 455/439; 455/450; 370/331; 370/329

(58) Field of Classification Search .................. 455/436, 455/450, 509, 510; 370/331, 329
See application file for complete search history.

(56) References Cited

U.S. PATENT DOCUMENTS

| | | | |
|---|---|---|---|
| 5,787,346 A * | 7/1998 | Iseyama | 455/439 |
| 6,246,670 B1 * | 6/2001 | Karlsson et al. | 370/244 |
| 6,385,449 B2 | 5/2002 | Eriksson et al. | |
| 7,047,009 B2 | 5/2006 | Laroia et al. | |

(Continued)

FOREIGN PATENT DOCUMENTS
EP   1959708 A1   8/2008
WO   2008024788 A2   2/2008

OTHER PUBLICATIONS

IPWIRELESS: "Random and Dedicated Preamble based RACH access in E-UTRAN" May 3, 2007, 3GPP DRAFT; R2-072090, 3rd Generation Partnership Project (3GPP), Mobile Competence Centre; 650, Route Des Lucioles; F-06921 Sophia-Antipolis Cedex; France, XP050134957.

(Continued)

*Primary Examiner* — Rafael Pérez-Gutiérrez
*Assistant Examiner* — Allahyar Kasraian

(57) ABSTRACT

The present invention provides for a method for allocating by a plurality of source base stations of a cellular wireless communication support infrastructure a temporary resource request identifier to a wireless communication device for accessing a target base station. The method includes identifying a list of temporary resource request identifiers associated with the target base station for use by one or more wireless communication devices, wherein the list includes a subset of one or more part time temporary resource request identifiers whose respective assignment to a corresponding grouping of one or more source base stations at a particular time is rotated between more than one of the plurality of corresponding groupings of one or more source base stations. The present invention further provides for allocating a temporary resource request identifier to a wireless communication device for accessing a target base station, where a corresponding one of the temporary resource request identifiers is allocated to a particular wireless communication devices, where the temporary resource request identifier includes a limitation of usage corresponding to particular communication time intervals during which the temporary resource request identifier can be used with the target base station.

11 Claims, 8 Drawing Sheets

U.S. PATENT DOCUMENTS

| | | | |
|---|---|---|---|
| 7,218,937 | B2 | 5/2007 | Peltola et al. |
| 2003/0036387 | A1* | 2/2003 | Kovacs et al. ............... 455/442 |
| 2005/0250499 | A1 | 11/2005 | Lee et al. |
| 2006/0056395 | A1* | 3/2006 | Huomo et al. ............... 370/352 |
| 2006/0153130 | A1* | 7/2006 | Laroia et al. ................ 370/329 |
| 2006/0183429 | A1* | 8/2006 | Anderson ................ 455/67.13 |
| 2006/0229090 | A1* | 10/2006 | LaDue ........................ 455/507 |
| 2007/0047493 | A1 | 3/2007 | Park et al. |
| 2007/0173256 | A1* | 7/2007 | Laroia et al. ................ 455/436 |
| 2007/0249347 | A1* | 10/2007 | Saifullah et al. ............. 455/436 |
| 2008/0182579 | A1 | 7/2008 | Wang et al. |
| 2008/0254800 | A1* | 10/2008 | Chun et al. .................. 455/438 |
| 2008/0267127 | A1* | 10/2008 | Narasimha et al. .......... 370/331 |
| 2008/0267131 | A1 | 10/2008 | Kangude et al. |
| 2008/0268849 | A1* | 10/2008 | Narasimha et al. .......... 455/437 |
| 2008/0268850 | A1* | 10/2008 | Narasimha et al. .......... 455/437 |
| 2010/0202402 | A1* | 8/2010 | Dalsgaard et al. ........... 370/331 |

OTHER PUBLICATIONS

"Use of dedicated RACH signatures" Feb. 8, 2007, 3GPP DRAFT; R2-070687 Dedicated Signatures_R2, 3rd Generation Partnership Project (3GPP), Mobile Competence Centre; 650 Route Des Lucioles; F-06921 Sophia-Antipolis Cedex; France, XP050133725.

U.S. Appl. No. 11/742,112, filed Apr. 30, 2007 in the name of Narashimha et al., entitled, "Method and Apparatus for Handover in a Wireless Communication System".

Nokia: "Non Contention Based Handover" Ericsson, TSG-RAN WG2 Meeting #56BIS, Sorento Italy, vol. R2-070011, Jan. 15, 2007, pp. 1-4 XP003023806.

Fujitsu: "Random Access for Less-Contention-Based Handover" 3GPP TSG-RAN-WG1 Meeting #46BIS, 3GPP TSG-RAN-WG2 Meeting #55, Seoul, Korea, vol. R1-062893, R1-062886, Oct. 9, 2006, pp. 1-9 XP003022788.

Ericsson: "On the Details of the Dedicated Preamble at Intra-LTE Handover" 3GPP TSG-RAN WG2 #59, Athens, Greece, vol. R2-073238 Aug. 20, 2007, pp. 1-3 XP003023805.

ITRI: "Early RACH Access with Reserved Signatures for inter-eNB Handover", 3GPP TSG_RAN WG2, Meeting #57, St. Julian's, Malta, 26th-3-th Mar. 2007, R2-071379, all pages.

\* cited by examiner

METHOD FOR ALLOCATING A TEMPORARY RESOURCE REQUEST IDENTIFIER FOR ACCESSING A TARGET BASE STATION

CROSS-REFERENCE TO RELATED APPLICATIONS

This patent application claims priority to U S. Provisional Application Ser. No. 60/976,644, which was filed on Oct. 1, 2007.

FIELD OF THE INVENTION

The present invention relates generally to the assignment of resources for accessing a target base station. More particularly, the present invention relates to the allocation of a temporary resource request identifier in connection with accessing a target base station of a cellular wireless communication network.

BACKGROUND OF THE INVENTION

The initiation of access by a wireless communication device of a target base station of a cellular communication network can arise under at least a couple of different circumstances. At least a couple of examples of circumstances under which initiation of access occurs include instances in which a wireless communication device is powering up after having been initially switched on from an off condition, a wireless communication device is initiating a call to another wireless communication device, and/or the wireless communication device is transitioning from one location, such as a cell, supported by a first base station to another location, supported by a different base station. In at least some instances, the initial communication with the network infrastructure (i.e. cellular base station), is facilitated through the use of a temporary resource request identifier, which is used to temporarily distinguish one wireless communication device from another wireless communication device, until the wireless communication device is identified, and correspondingly communication resources are allocated and/or are assigned to the wireless communication device by the cellular wireless communication infrastructure for accessing a target base station.

In some instances, the wireless communication device will be in the middle of a call, when a need to obtain communication resources from a new target base station is identified. In such an instance, a wireless communication device may be transitioning away from one cell and toward another cell. In turn, the communication connection with a base station supporting the communication connection in the first cell may become more difficult to maintain, where the wireless communication device's current position may better support continued communication through another (i.e. target) base station that supports communication in another cell. Depending upon the rate at which a wireless communication device may be moving away from the first cell, and correspondingly the rate at which the current communication connection through the first cell is degenerating, there may be a time critical aspect for processing a handoff of the current call connection from a first base station in a first cell to a target base station in another cell, and for correspondingly processing a request for resources from the target base station for supporting continued communication of the already established call connection.

There are generally a finite number of temporary identifiers, that are used to support the various types of request for resources, that are associated with any particular target base station from which resources can be requested, which must support potentially multiple simultaneous and/or nearly simultaneous requests from multiple wireless communication devices. At least one example of a temporary resource request identifier, which serves to temporarily identify a particular wireless communication device relative to a target base station includes a random access channel (RACH) preamble, which is used to request access in at least some cellular wireless communication systems.

In some instances, a subset of the available temporary resource request identifiers may be set aside for at least some of the different types of circumstances under which a resource request might be made of a target base station. For example, at least some of the temporary resource request identifiers may be reserved for facilitating a handover of an on-going and/or an already established call from a source base station to a target base station. In some instances, a particular temporary resource request identifier will be assigned to the wireless communication device. In other instances, the particular temporary resource request identifier that is used might be randomly selected by the wireless communication device from a corresponding list of temporary resource request identifiers associated with the particular type of request.

When multiple wireless communication devices attempt to simultaneously make use of the same temporary resource request identifier, there can sometimes be a conflict, which can preclude one or more of the wireless communication devices, which are attempting to use the same temporary resource request identifier, from being able to successfully complete the request for resources. This can be particularly problematic when the need for obtaining communication resources with a particular target base station might be time critical, such as when requesting a handover during an existing call connection when the existing communication connection via a source base station, which supports the call, is about to fall below the threshold necessary for maintaining the call connection. When one or more wireless communication devices are unable to successfully complete the request for resources in any particular time period, it is generally necessary for a subsequent request to be attempted.

When the particular temporary resource request identifier to be used to access a particular target base station is selected (randomly, arbitrarily and/or following a particular predefined pattern, etc.) by the wireless communication device, there is always the possibility that more than one wireless communication device will independently select the same temporary resource request identifier to be used. The likelihood of the same temporary resource request identifier being selected for use is generally dependent upon the number of wireless communication devices making a selection and the number of available temporary resource request identifiers to select between.

As noted above, the particular temporary resource request identifier used by a particular wireless communication device could be assigned. When the temporary resource request identifier to be used by the wireless communication device is assigned, as opposed to being randomly selected, the likelihood of a conflict can be more closely managed, at least between the particular temporary resource request identifiers that are assigned by the same entity. However sometimes the particular wireless communication devices, which are attempting to request resources from a particular target base station might originate from multiple different source base station which border the area associated with the target base station from a different direction. In such an instance, the common entity which might be able to assign a temporary resource request identifier for all possible wireless communication devices coming from different surrounding source base stations might be several communication steps removed. In such an instance, the latency associated with making the request for a temporary resource request identifier, receiving an assigned temporary resource request identifier, and making use of the same, might preclude the same temporary resource request identifier from being further assigned for some duration, such as, until the same previously assigned identifier is detected as having been used or a corresponding time out period has elapsed, which in turn might limit the rate at which assignment requests using a finite number of temporary resource request identifiers can be supported. In some instances, reserving a temporary resource request identifier for a particular planned request for the entire period of time necessary to communicate the assigned identifier until the time that the assigned identifier is used may be impractical.

Correspondingly, a method which provides for a more effectively assignment and/or selection criteria for allocating one of a plurality of temporary resource request identifiers for use by a wireless communication device in accessing a target base station would be beneficial.

SUMMARY OF THE INVENTION

The present invention provides for a method for allocating by a plurality of source base stations of a cellular wireless communication support infrastructure a temporary resource request identifier to a wireless communication device for accessing a target base station of the cellular wireless communication support infrastructure. The method includes identifying a list of temporary resource request identifiers associated with the target base station for use by one or more wireless communication devices requesting resources from the target base station, wherein the list includes a subset of one or more part time temporary resource request identifiers whose respective assignment to a corresponding grouping of one or more source base stations at a particular time is rotated between more than one of the plurality of corresponding groupings of one or more source base stations. The method then provides for the detection of a desire by a particular wireless communication device for resources from the target base station, while the particular wireless communication device is communicating with a particular source base station. A temporary resource request identifier, which is currently associated with the corresponding grouping of one or more source base stations including the particular source base station to the particular wireless communication device is then allocated.

In at least one embodiment, the list additionally includes a subset of one or more full time temporary resource request identifiers that are respectively assigned to one of a plurality of corresponding grouping of one or more source base stations.

The present invention further provides a method for allocating by a plurality of source base stations of a cellular wireless communication support infrastructure a temporary resource request identifier to a wireless communication device for accessing a target base station of the cellular wireless communication support infrastructure. The method includes detecting a desire from one or more wireless communication devices for resources from the target base station, while the one or more wireless communication devices are communicating with a particular source base station. A determination is then made regarding the length of time that each of the wireless communication devices for which a desire for resources from the target base station has been detected has been waiting for an allocation. Based upon the length of time that each of the wireless communication devices for which a desire for resources from the target base station has been detected has been waiting for an allocation, one of one or more temporary resource identifiers is then assigned from a list of temporary resource identifiers identified as being available for assignment by a particular source base station to each of a number of the wireless communication devices for which a desire for resources from the target base station has been detected up to a number of wireless communication devices equal to the number of temporary resource identifiers in the list of temporary resource identifiers identified as being available for assignment by a particular source base station, in each of a plurality of predefined communication intervals. If the number of the wireless communication devices for which a desire for resources from the target base station has been detected exceeds the number of temporary resource identifiers in the list of temporary resource identifiers identified as being available for assignment by a particular source base station, then holding over for assignment in a subsequent predefined communication interval a number of wireless communication devices equal to the amount that the number of the wireless communication devices for which a desire for resources from the target base station has been detected exceeds the number of temporary resource identifiers in the list of temporary resource identifiers identified as being available for assignment by a particular source base station, unless there are more wireless communication devices for which a desire for resources from the target base station has been detected for which the length of time that each of the wireless communication devices for which a desire for resources from the target base station has been detected has been waiting for an allocation exceeds a maximum allowable assignment delay. If so, respectively assigning each one of the one or more temporary resource identifiers from the list of temporary resource identifiers to a corresponding one of the wireless communication devices for which a desire for resources from the target base station has been detected for which the length of time that each of the wireless communication devices for which a desire for resources from the target base station has been detected has been waiting for an allocation exceeds a maximum allowable assignment delay, and sequentially assigning a temporary resource request identifier which is not assigned to the source base station until all wireless communication devices for which a desire for resources from the target base station has been detected for which the length of time that each of the wireless communication devices for which a desire for resources from the target base station has been detected has been waiting for an allocation exceeds a maximum allowable assignment delay have been assigned a temporary resource identifier.

The present invention still further provides a method for allocating a temporary resource request identifier from a plurality of available temporary resource request identifiers to a wireless communication device for accessing a target base station of the cellular wireless communication support infrastructure in one of a plurality of communication time intervals. The method includes detecting a desire for resources from the target base station for one or more wireless communication devices. A corresponding one of the temporary resource request identifiers is then allocated to a particular one of the one or more wireless communication devices, where at least some of the temporary resource request identifiers include a limitation of usage corresponding to particular communication time intervals during which the temporary resource request identifier can be used with the target base station, where the limitation of usage defines a subset of the plurality of communication time intervals corresponding to less than all of the plurality of communication time intervals during which the temporary resource request identifier can be used by the particular one of the one or more wireless communication devices.

In at least one embodiment, the same temporary resource request identifier is allocated to multiple wireless communication devices, wherein the limitation of usage for each of the multiple wireless communication devices corresponds to a different subset of the plurality of communication time intervals.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
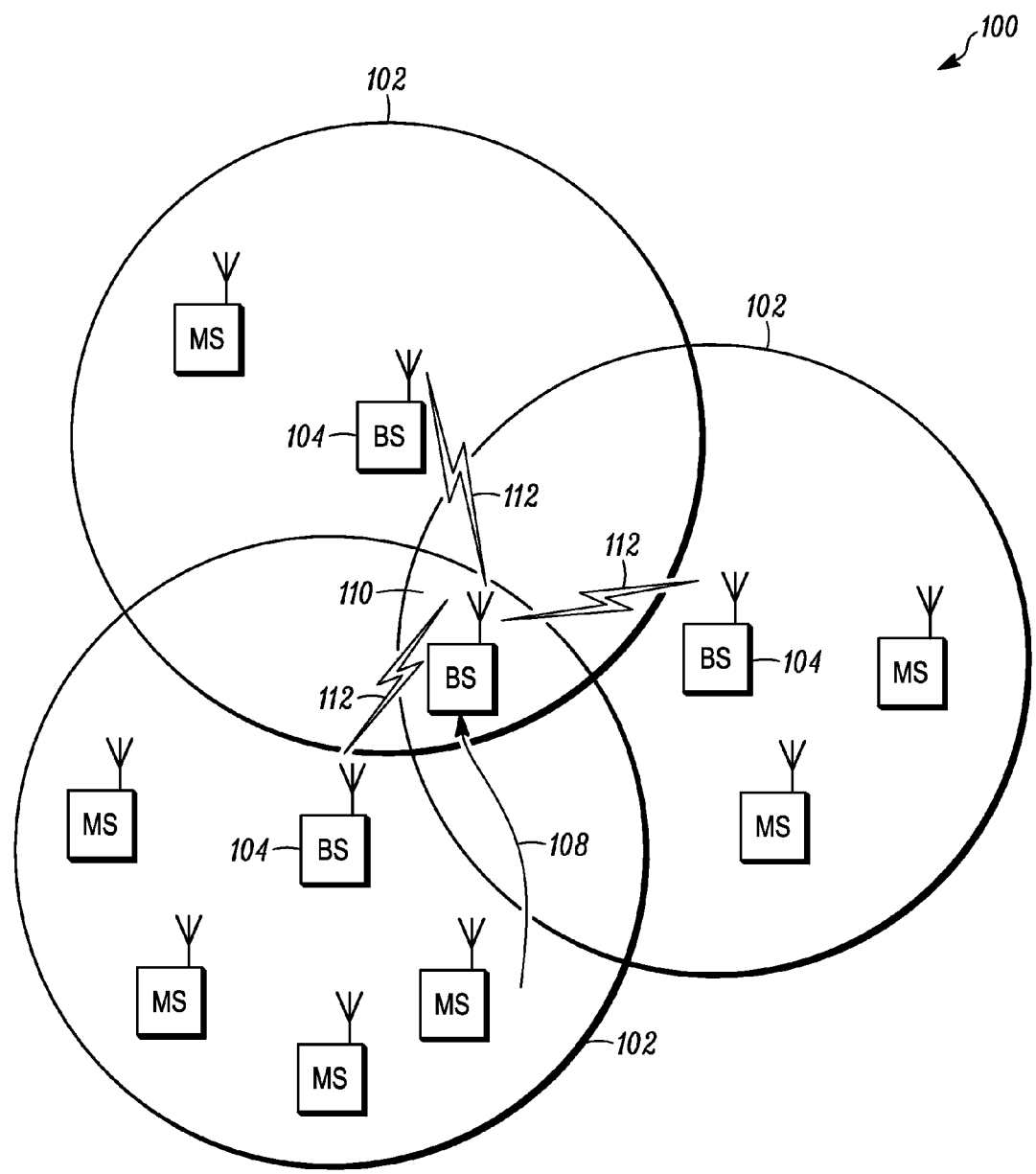
FIG. 1 is an exemplary topographical view of at least a portion of an exemplary wireless communication system illustrating an environment within which at least one embodiment of the present invention can operate.

FIG. 1 illustrates an exemplary topographical view of at least a portion of a wireless communication system. The topographical view 100 includes a plurality of cells 102 pictorially represented as overlapping circles. The circles are only rough approximations of the footprint or area of coverage associated with each of a plurality of cellular regions, where in reality the area of transmission is not so uniformly defined. Each cell is typically served by one or more base stations (BS) 104, referred to as a serving station, which may each be associated with one or more base transceiver stations that communicate with mobile subscriber (MS) 106, such as a mobile wireless communication device, located and/or traveling 108 within the corresponding cell 102.

Generally, the further a mobile subscriber 106 moves away from the serving base station 104 the weaker the signal gets. Conversely, as a mobile station 106 moves toward another base station 104 the signal typically becomes stronger. As a mobile subscriber 106 continues to move away from a serving base station 104 and towards the base station 104 of a neighboring cell 102, at some point it will become desirable to transfer control of the continued communication to the base station 104 of the neighboring cell 102. The decision to transfer control is typically determined based upon the relative strength of the signal received from the serving base station and the base stations of each of the nearby cells 102. Consequently, wireless communication devices operating in association with several over the air operating standards monitor the relative strength of signals from both the serving cell and the one or more nearby neighboring cells.

As a mobile station approaches a boundary region between two cells, some over the air operating standards, which employ a soft handover, will begin to concurrently monitor the signals from multiple cellular regions, and may route a particular communication between each of the multiple cellular regions, until the mobile station firmly establishes its presence in one of the cellular regions. A soft handover is commonly referred to as a make before break, where the communication channel is typically established with the new target cell prior to releasing the prior serving cell and any of the other communication connections with any of the other cellular regions during the soft handover. During this transition period, a mobile station 106 may monitor signals or establish a concurrent communication channel with up to six different cellular regions. In each instance, the communication with each new target base station is accommodated through a resource request with the base station in the new targeted cellular region. In some instances, the signal being communicated from multiple cellular regions can be combined to enhance signal reception.

In other instances a hard handover may be employed, where upon determining that another base station associated with another region is better suited for maintaining a communication connection with the mobile subscriber, the source base station will instruct the mobile station to establish a connection with a new target base station and will sometimes provide a temporary resource request identifier to use in connection with establishing the connection with the new target base station. Upon providing the information for establishing the new connection, the communication with the source base station is severed, and support for any on-going continued communication is suspended until a connection with the target base station is established.

Arrow 108 is intended to represent a possible exemplary movement of mobile station 106 from an area within the lower left hand cellular region into an area corresponding to a region of overlap 110 for three different adjacent cellular regions. While the mobile station is within this area, it is possible that the mobile station would need to establish and could be maintaining a communication connection by receiving 112 the same communication from each of the three overlapping cells. This is generally the case when the mobile station 106 is engaged in a communication connection with the cellular network infrastructure, via a dedicated channel. In such an instance, the three overlapping cells may be identified as the active set of the particular mobile station for the particular communication via the dedicated channel.

Figure 2:
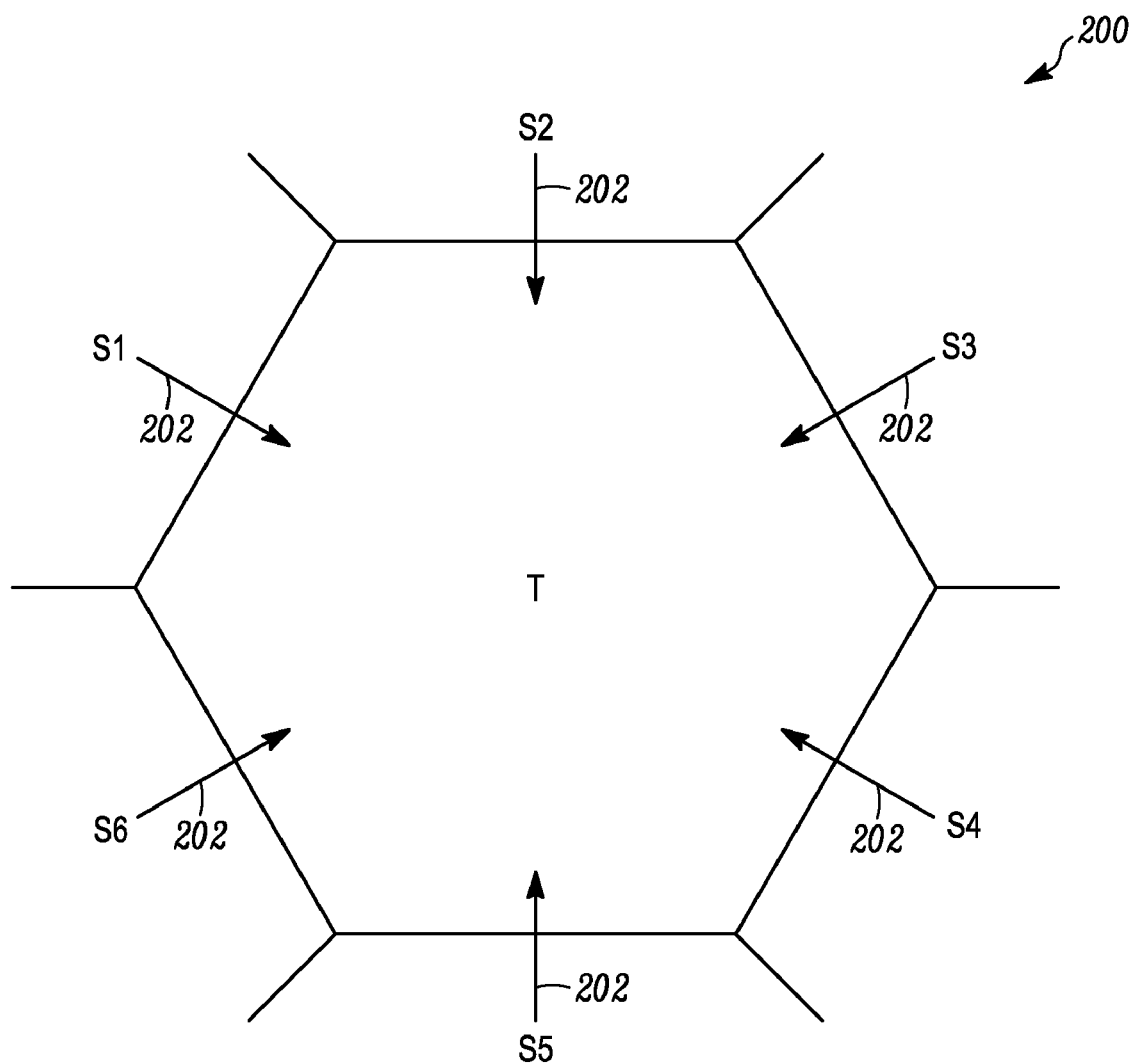
FIG. 2 is a further exemplary topographical view of a communication area and a partial view of a plurality of neighboring communication areas, further illustrating an environment within which at least one embodiment of the present invention can operate.

For a particular target cellular area and corresponding target base station, there are several adjacent or nearby cellular areas with corresponding source base stations from which a particular mobile subscriber might be transitioning. FIG. 2 illustrates a further exemplary topographical view of a communication area and a partial view of a plurality of neighboring communication areas, further illustrating an environment within which at least one embodiment of the present invention can operate. In the embodiment illustrated in FIG. 2 a partial hexagonal pattern 200 has been illustrated, which includes a target cellular region T, surrounded by six potential source cellular regions S1-S6. The six potential source cellular regions S1-S6 may each need to coordinate with the target cellular region T in assigning temporary resource request identifiers for requesting access to communication resources of the target cellular region via the corresponding target base station. The occurrence of such a request generally coincides with the movement 202 of a mobile subscriber from one of the source cellular regions S1-S6 to the target cellular region T. Generally each of the potential source cellular regions S1-S6 represents a different group of one of more source base stations.

While it is possible that the mobile station in some systems might randomly select a temporary resource request identifier from a list of available identifiers, in such an instance it is possible that a second mobile station might select the same identifier. Multiple mobile stations using the same identifier at the same proximate time create the potential for a conflict or contention that might limit the ability of one or both of the mobile stations from being able to gain access to the requested communication resources. Alternatively, one or more communication system entities could allocate a temporary resource request identifier in a manner which is intended to limit the possibilities for conflicts and/or contentions.

Figure 3:
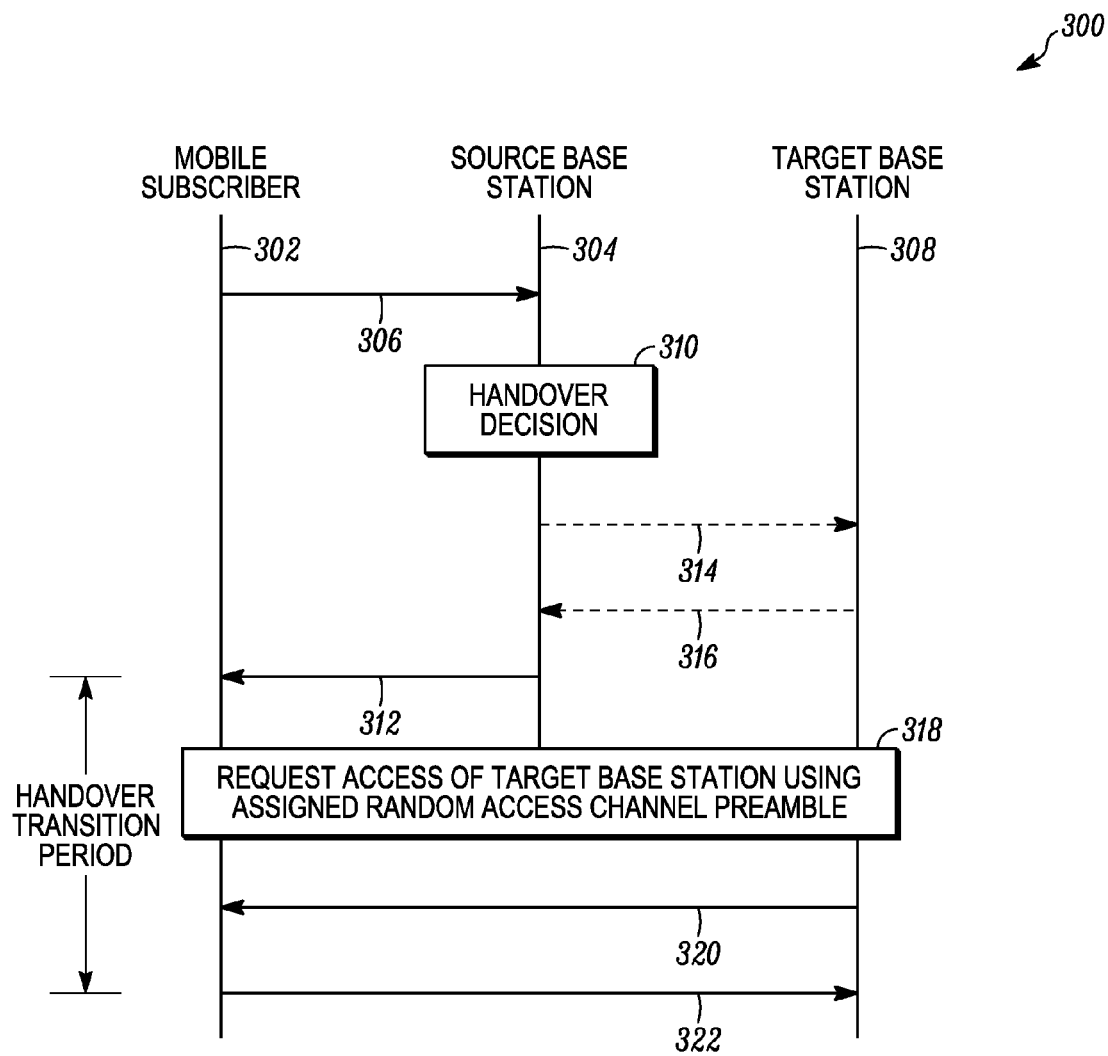
FIG. 3 is an information flow diagram of a method for requesting resources by a mobile subscriber of a target base station as part of a handover.

As previously identified, a request for resources from a target base station, associated with a target cellular region T can sometimes be associated with a decision to handover control of an ongoing communication. FIG. 3 illustrates an information flow diagram 300 of a method for requesting resources by a mobile subscriber of a target base station as part of a handover.

Initially, as part of at least some of the communications 306 between a mobile subscriber 302 and a base station that is initially serving the mobile subscriber, such as the source base station 304 in the illustrated embodiment, are monitored for characteristics that might suggest that a handover is desirable. In some instances the characteristics might be a measurable feature of the physical signal being communicated. In other instances the characteristics might be information being communicated via the signal being monitored. A couple of examples of characteristics that might be monitored for purposes of making a handover decision include signal strength, and the location of the mobile subscriber including position, as well as speed and direction of movement. From these and/or other signal characteristics on-going decisions 310 are made as to whether the mobile subscriber should be handed over from a source base station 304 to a target base station 308.

Upon an affirmative decision, which indicates a handover is desirable, a temporary resource request identifier, such as a random access channel (RACH) preamble, is allocated to the mobile subscriber for purposes of requesting resources in the form of a communication connection from the base station that is to subsequently serve the mobile subscriber 302, such as the target base station 308. In some instances the source base station 304 might identify and allocate the temporary resource request identifier. In other instances the source base station 304 might coordinate with the target base station 308 to identify and obtain a temporary resource request identifier for allocation. In either instance, the identified temporary resource request identifier is generally communicated 312 to the mobile subscriber by way of the source base station 304. Where the temporary resource request identifier is assigned by the target base station 308, the source base station 304 will typically need to communicate with the target base station 308 to inform 314 the target base station of the desired handover, and to receive 316 a communication including a handover confirmation and a temporary resource request identifier allocation for use in establishing the new communication connection.

Once the mobile subscriber 302 receives 312 the temporary resource request identifier from the source base station 304, the mobile subscriber 302 requests 318 access to resources of the target base station 308 using the assigned temporary resource request identifier, such as a random access channel preamble. A request for resources of the target base station 308 is generally complete when an upload link is established 320, and handover is confirmed 322.

If the source base station 304 allocates the temporary resource request identifier, the source base station 304 will generally select a temporary resource request identifier from a list of temporary resource request identifier reserved for use in requesting resources from a target base station 308 for purposes of supporting a handover. Because potentially multiple different source base stations and/or grouping of base stations S1-S6 are selecting from the same list of available temporary resource request identifiers, in order to minimize contentions and conflicts resulting from multiple mobile subscribers being allocated and attempting to use the same temporary resource request identifier, the start point for each of the source base stations S1-S6 within the list of temporary resource request identifiers will often be staggered.

Figure 4:
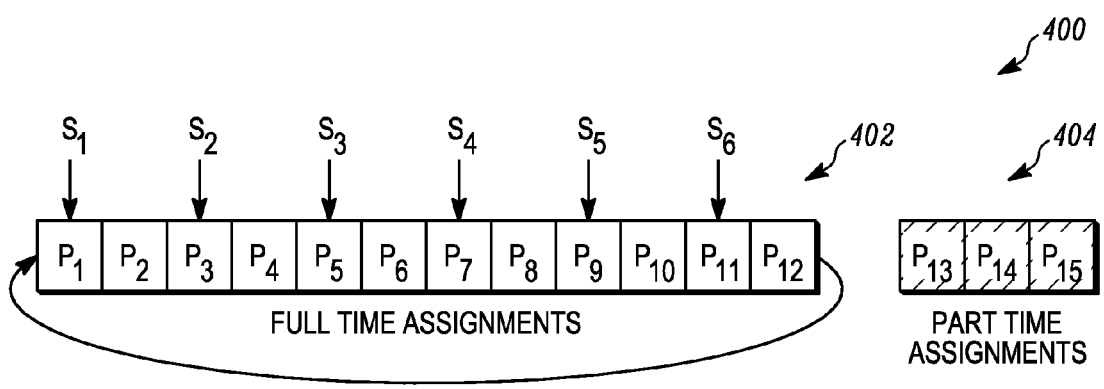
FIG. 4 is an exemplary arranged list of temporary resource request identifiers, that can be allocated and/or assigned as part of requesting resources of a target base station, in accordance with at least one embodiment of the present invention.

FIG. 4 illustrates an exemplary arranged list 400 of temporary resource request identifiers, that can be allocated and/or assigned as part of requesting resources of a target base station, in accordance with at least one embodiment of the present invention. The arranged list includes a set 402 of temporary resource request identifiers P1-P12 having full time assignments, and a set 404 of temporary resource request identifiers P13-P15 having part time assignments.

In the illustrated embodiment, the set 402 of full time temporary resource request identifiers includes a wrap around list of temporary resource request identifiers P1-P12, which can be assigned where the different source base stations S1-S6 will begin selection from the list at a different point identified by a corresponding arrow in the figure. For example, source base station S1 is identified as allocating temporary resource request identifiers beginning at P1. The second allocation in a particular time period would be P2, and the third allocation would be P3, which corresponds to the first temporary resource request identifier to be assigned by S2. Upon allocation of P12, the next allocation in a particular time period would correspond to P1. In at least some instances, the start point within the wrap around list of temporary resource request identifiers is reset at the beginning of each predetermined time period.

While the selection beginning points are shown being generally equally spaced apart, in some instances it may be desirable to provide more or less space between adjacent start points for some source base stations. For example, a difference in spacing may be beneficial in instances where a particular source base station and/or grouping of source base stations has a disproportionately larger or smaller number or disproportionately larger or smaller rate at which mobile subscribers originating from the source base station and/or grouping of source base stations are anticipated to request a handover into the target base station. An example of a factor that might impact the anticipated rate or number of mobile subscribers requesting handover between a particular pair of base stations includes the presence of a well traveled highway that crosses the boundary between the two corresponding cellular regions.

In the illustrated embodiment, the set 404 of part time temporary resource request identifiers includes one or more temporary resource request identifiers that can be assigned to a particular source base station for allocation on a part time basis and/or fractionally. The part time assignments include temporary resource request identifiers that are assigned to a particular source base station for allocation on a part time basis, and/or include temporary resource request identifiers that are assigned for allocation by any source base station in support of handover requests on a part time basis. Where the temporary resource request identifiers are assigned to a particular source base station on a part time basis, different source base stations may be assigned a particular temporary resource request identifier for allocation during one or more predetermined time periods. Such an assignment may be periodic in nature, or may be made on an as needed basis.

Figure 5:
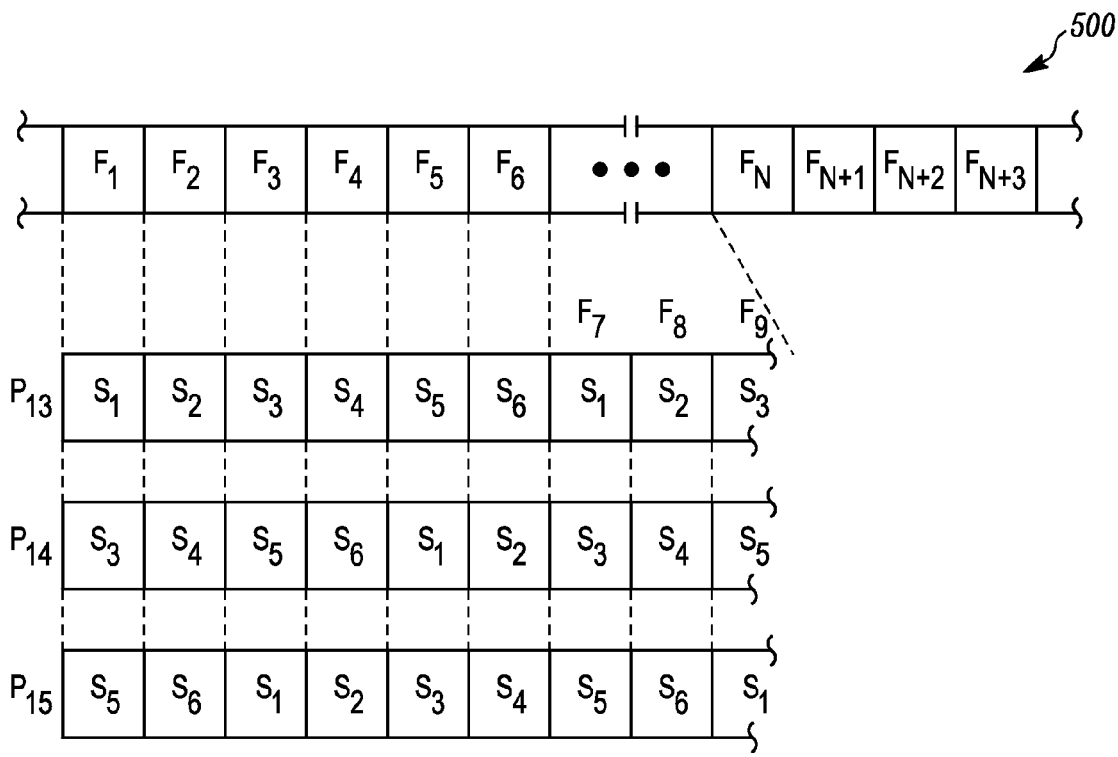
FIG. 5 is a sequence of a plurality of predefined communication time intervals, and an exemplary part time association with one or more source base station of at least a couple of allocatable temporary resource request identifiers for use with a target base station.

FIG. 5 illustrates a sequence 500 of a plurality of predefined communication time intervals F1-F6 and Fn-Fn+3, and an exemplary part time association with one or more source base station of at least a couple of allocatable temporary resource request identifiers P13-P15 for use with a target base station 208. The predefined communication time intervals could correspond to an already established unit of time measure within the system of communication, or could be any sequence of time periods established for use with the assignment and allocation of temporary resource request identifiers. In many instances the predefined communication time intervals will coincide with preestablished and/or already existing periodic time periods having finite duration, such as a sequence of communication frames.

In the illustrated embodiment, each of the temporary resource request identifiers P13-P15 has a rotating assignment to one of the source base stations S1-S6, which enables that source base station to allocate the temporary resource request identifier during the corresponding assigned time period. By way of example only, the predefined communication time interval P13 is assigned to S1 during the first communication time interval and every sixth communication time interval (F7, F13, F19, etc.), thereafter. Further, P14 is assigned to S1 during the fifth communication time interval and every sixth communication time interval, thereafter, and P15 is assigned to S1 during the third communication time interval and every sixth communication time interval, thereafter. P13-P15 are similarly assigned to each of S2-S6 in generally non-overlapping fashion. As such, each of the six source base station has an extra temporary resource request identifier to allocate every other predefined communication time interval. It is generally possible for the assigned temporary resource request identifiers to be separately assigned for use in connection with requesting resources from the target base station for each of the predefined communication time intervals. It is also possible that some of the source base stations will have access to a part-time temporary resource request identifier for purposes of allocation at a different ratio of time intervals relative to other source base stations.

Figure 6A:
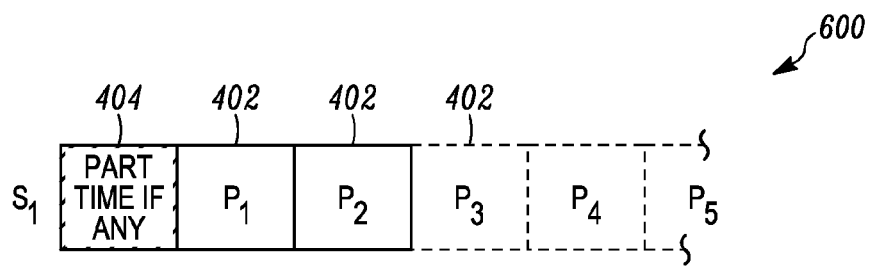
FIGS. 6A and 6B are an exemplary assignment of temporary resource request identifiers to a source base station or base station grouping for allocation to a wireless communication device in a particular communication time interval for use in requesting resources from a target base station and an exemplary order of allocation of the same.
Figure 6B:
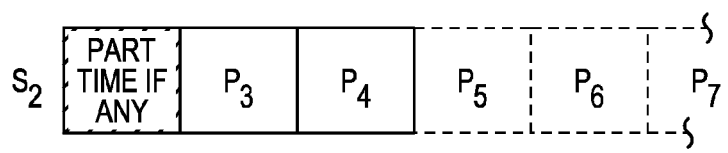

FIGS. 6A and 6B illustrate an exemplary assignment of temporary resource request identifiers to a source base station or base station grouping for allocation to a wireless communication device in a particular communication time interval for use in requesting resources from a target base station and an exemplary order of allocation of the same. In accordance with at least one embodiment, any assigned part time temporary resource request identifiers will be allocated to a mobile subscriber seeking to request resources prior to an allocation of the assigned full time temporary resource request identifiers.

Upon allocation of all assigned part time and full time temporary resource request identifiers, the source base station may allocate assigned full time temporary resource request identifier of another base station, which is next in-line sequentially relative to the last full time temporary resource request identifier allocated. For S1, as illustrated in FIG. 6A, this would involve an order of allocation including any part time assignments of temporary resource request identifiers, and then any full time temporary resource request identifiers associated with the particular source base station, such as P1 and P2 in the illustrated example. Any further allocations in the same predefined communication time interval would allocate P3, which is assigned to S2. An allocation by S1 of P3 would likely only create a conflict or contention if S2 similarly allocated P3 for use. FIG. 6B illustrates an exemplary order of allocation for S2, which includes any current part-time assignments, and then the assigned full-time assignments P3 and P4. Any further temporary resource request identifier allocation would attempt to make use of P5, and then P6, etc.

Upon the expiration of the predefined communication time interval, each of the source base stations would begin allocating temporary resource request identifiers starting with any part-time assignments and any full-time assignments before attempting to allocate the next full-time temporary resource request identifier in line from the list of full-time temporary resource request identifiers, which is not assigned to the particular source base station.

In at least a further embodiment of the present invention, it is possible for the target base station to allocate the temporary resource request identifiers for all resource requests. As noted in the timing diagram illustrated in FIG. 3, this typically entails additional communication between the source base station and the target base station. Because the additional communication between the source base station and the target base station further delays the receipt of the allocation by the particular mobile subscriber. In at least some circumstances it may be beneficial to allocate the particular temporary resource request identifier for more than one predefined communication time interval.

However, instead of reserving the particular temporary resource request identifier for use by a single mobile subscriber during the entire period of time, that might span across several predefined communication time intervals, when the target base station makes the allocation, the target base station can additionally include usage and/or time restrictions as to when the temporary resource request identifier can be used. In this way, the same temporary resource request identifier can be assigned to another mobile subscriber without fear of a communication conflict or contention, if the communication use restrictions are selected so as to correspond to mutually exclusive time periods. Furthermore the chances of communication conflicts or contention can be reduced if the usage restriction is almost, but not quite mutually exclusive. For example, one exemplary embodiment might allocate the same temporary resource request identifier to a first mobile subscriber for use in an even communication time interval, and to a second mobile subscriber for use in an odd communication time interval. Such a restriction would effectively double the number of allocations with the same number of temporary resource request identifiers without fear of contention or conflict and without significantly delaying the permissible use of the temporary resource request identifier. Still further different multiples could be used as well as offset values to allow for an even greater multiplication of usage for the same number of temporary resource request identifiers.

Figure 7:
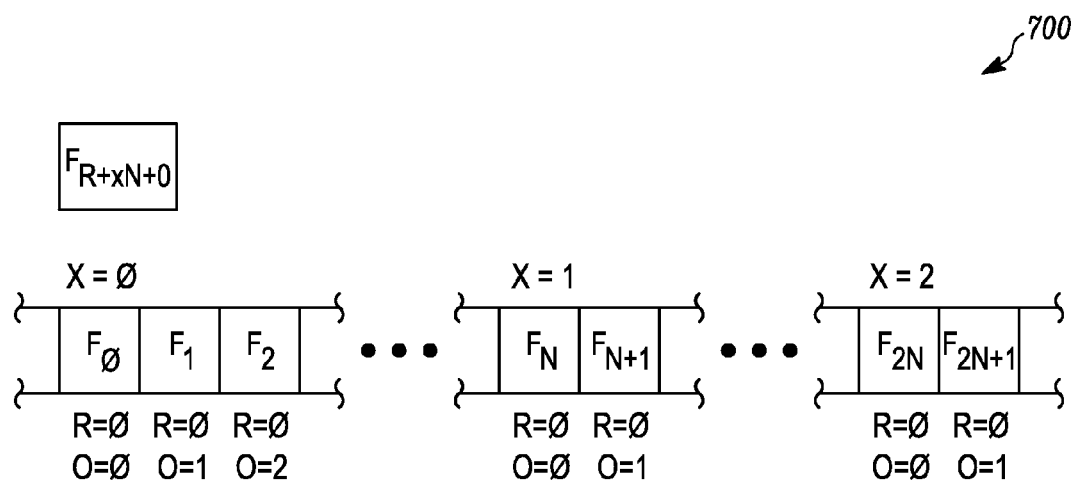
FIG. 7 is an exemplary frame referencing system for use in allocating temporary resource request identifiers, in accordance with at least one exemplary embodiment of the present invention.

FIG. 7 illustrates an exemplary frame referencing system 700 for use in allocating temporary resource request identifiers. The system as illustrated allows for a reference frame to be established corresponding to $F_R$, where a multiple N can define one of a group of communication time intervals that occur every Nth Frame. Using an offset O can further define a different grouping of communication time intervals that occurs every Nth Frame. In such an environment up to N different groupings can be defined with different offset values that are equal to or greater than zero, but less than N. In this way a target base station can assign the same temporary resource request identifier to multiple mobile subscribers for use during a fraction of the available communication time intervals.

Figure 8:
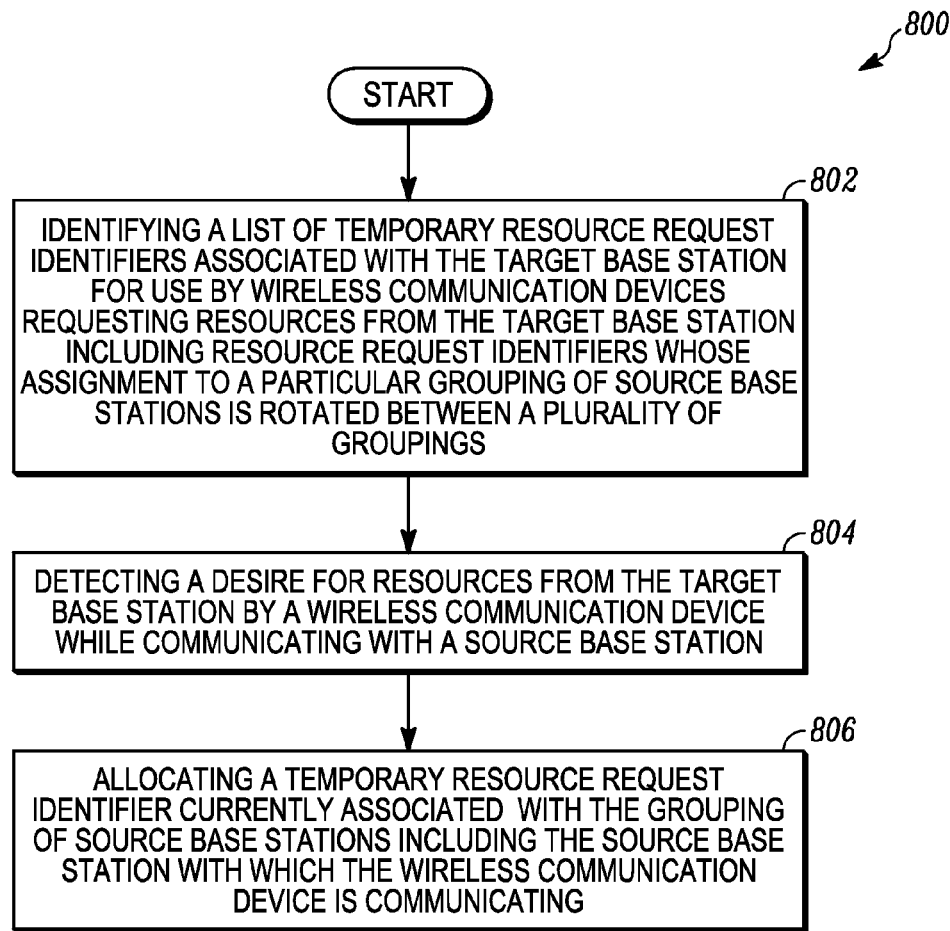
FIG. 8 is a flow diagram of a method for allocating by a plurality of source base stations of a cellular wireless communication support infrastructure a temporary resource request identifier to a wireless communication device for accessing a target base station of the cellular wireless communication support infrastructure, in accordance with at least one embodiment of the present invention.

FIG. 8 illustrates a flow diagram 800 of a method for allocating by a plurality of source base stations of a cellular wireless communication support infrastructure a temporary resource request identifier to a wireless communication device for accessing a target base station of the cellular wireless communication support infrastructure, in accordance with at least one embodiment of the present invention. The method includes identifying 802 a list of temporary resource request identifiers associated with the target base station for use by wireless communication devices, such as one or more mobile subscribers, requesting resources from the target base station including resource request identifiers whose assignment to a particular grouping of source base stations is rotated between a plurality of groupings. A desire for resources from the target base station by a particular wireless communication device, while communicating with a source base station, is detected 804. A temporary resource request identifier currently associated with the grouping of source base stations including the source base station with which the wireless communication device is communicating is then allocated 806 to the wireless communication device for purposes of requesting resources from the target base station.

Figure 9:
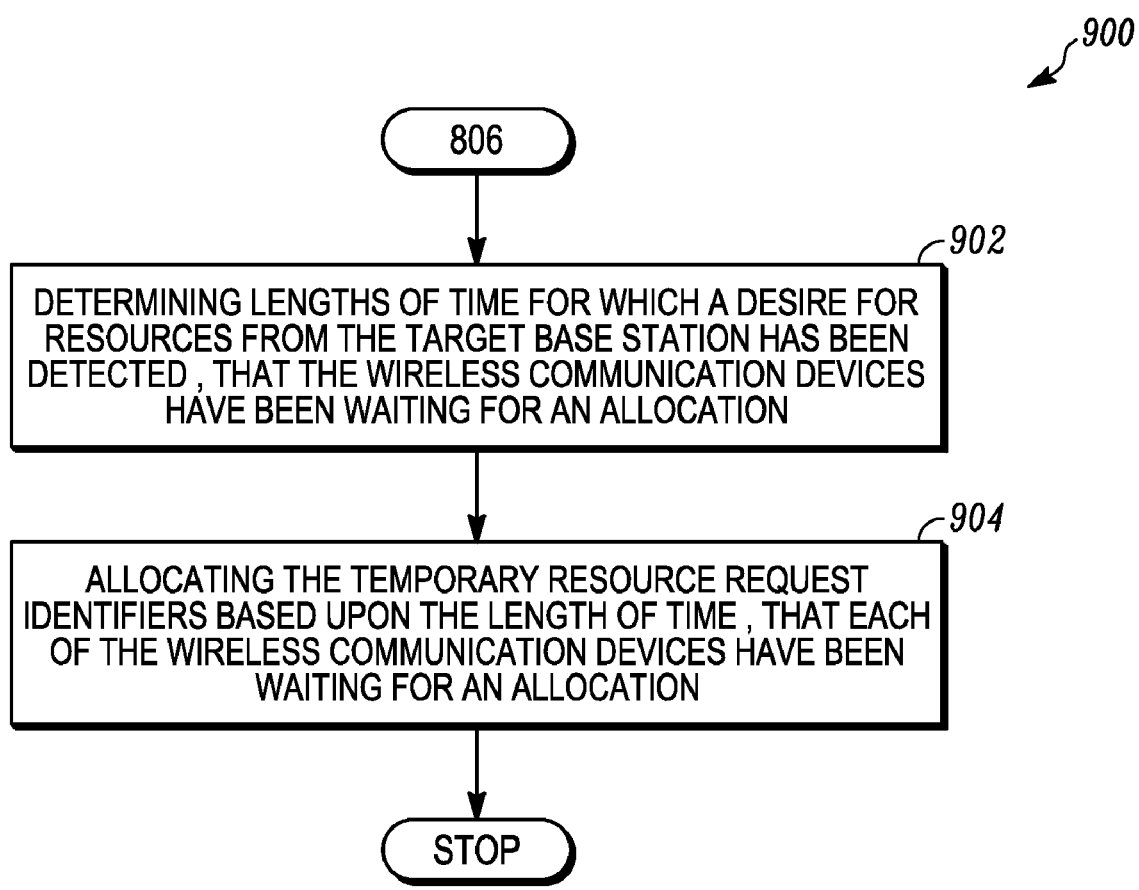
FIG. 9 is a more detailed flow diagram of a method wherein the full time temporary resource request identifiers and part time temporary resource request identifiers are allocated, based upon the length of time that the wireless communication devices for which a desire for resources from the target base station has been detected has been waiting for an allocation, in accordance with at least one aspect of the present invention.

FIG. 9 illustrates a more detailed flow diagram 900 of a method wherein the full time temporary resource request identifiers and part time temporary resource request identifiers are allocated 806, based upon the length of time that the wireless communication devices for which a desire for resources from the target base station has been detected has been waiting for an allocation, in accordance with at least one aspect of the present invention. More specifically, a length of time for which a desire for resources from the target base station has been detected, that the wireless communication device has been waiting for an allocation is determined 902. The temporary request identifiers are then allocated 904, based upon the length of time that each of the wireless communication devices have been waiting for an allocation. In many instances, the available temporary resource request identifiers will be assigned to wireless communication device for which a desire for resources from the target base transceiver station has been detected has been waiting the longest for an allocation.

Figure 10:
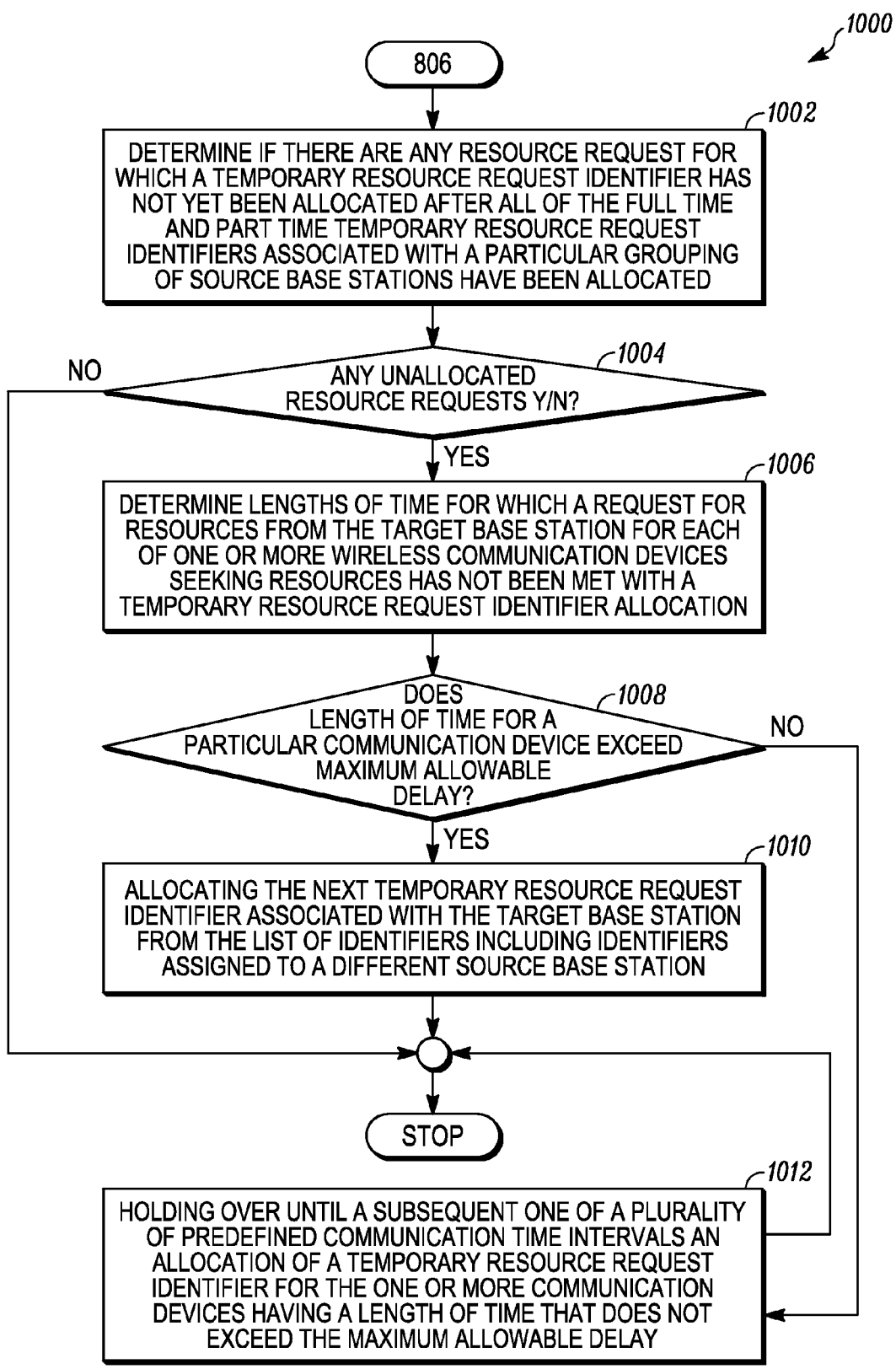
FIG. 10 is a more detailed flow diagram of a method for allocating temporary resource request identifiers, where all of the any full time temporary resource request identifiers and any part time temporary resource request identifiers for a particular source base station for a particular time period have already been allocated, in accordance with at least one aspect of the present invention.

FIG. 10 illustrates a more detailed flow diagram 1000 of a method for allocating temporary resource request identifiers, where all of the any full time temporary resource request identifiers and any part time temporary resource request identifiers for a particular source base station for a particular time period have already been allocated, in accordance with at least one aspect of the present invention. The method includes determining 1002 if there are any resource requests for which a temporary resource request identifier has not yet been allocated after all of the full time and part time temporary resource request identifiers associated with a particular grouping of source base station have been allocated. A determination 1004 is then made as to whether there are any unallocated resource requests after all of the part time and full time temporary resource request identifiers have been allocated for a particular communication time interval. If there are any unallocated resource requests, then a determination 1006 is made as to the lengths of time for which a request for resources from the target base station for each of one or more wireless communication devices seeking resources has not been met with a temporary resource request allocation.

The lengths of time are then compared relative to a maximum allowable allocation delay 1008. If the maximum allowable allocation delay has not been exceeded for a particular one of the mobile subscribers, then an allocation of a temporary resource request identifier to that particular mobile subscriber is held over 1012 until a subsequent one of the plurality of predefined communication intervals. If the maximum allowable allocation delay has been exceeded for a particular one of the mobile subscribers then the next temporary resource request identifier associated with the target base station from the list of identifiers is allocated 1010 including identifiers assigned to a different source base station.

Figure 11:
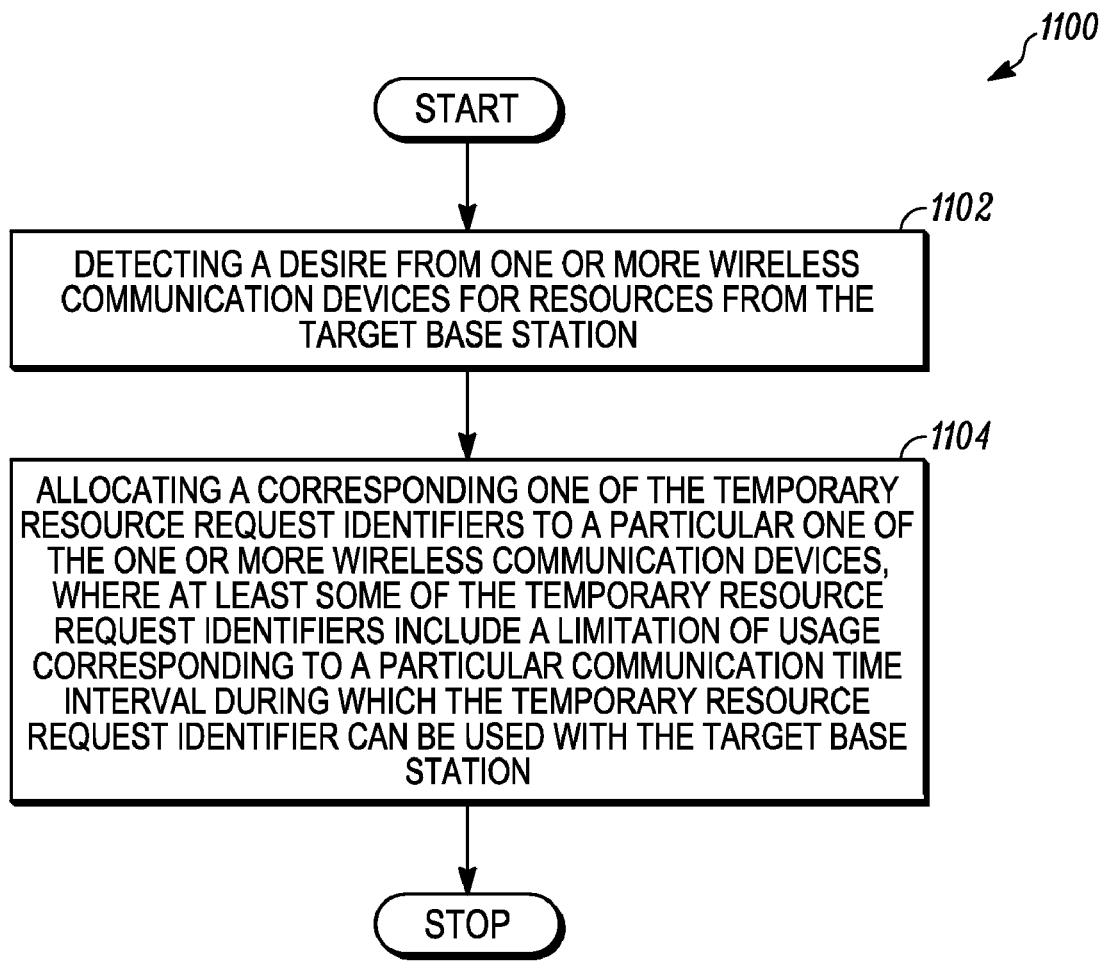
FIG. 11 is a flow diagram of a method for allocating by a target base station of a cellular wireless communication support infrastructure a temporary resource request identifier to a wireless communication device for accessing the target base station, in accordance with at least one embodiment of the present invention.

FIG. 11 illustrates a flow diagram 1100 of a method for allocating by a target base station of a cellular wireless communication support infrastructure a temporary resource request identifier to a wireless communication device for accessing the target base station, in accordance with at least one embodiment of the present invention. The method includes detecting 1102 a desire from one or more wireless communication devices for resources from the target base station. A corresponding one of the temporary resource request identifiers to a particular one of the one or more wireless communication devices is allocated 1104, where at least some of the temporary resource request identifiers include a limitation of usage corresponding to a particular communication time interval during which the temporary resource request identifier can be used with the target base station. As noted above such a limitation can involve an offset relative to a reference time frame, as well as define a grouping of communication time intervals that occurs every Nth Frame.

While the present invention has largely been described in the context of requesting resources from a target base station in support of a handover, there are other instances where resources are requested of a target base station including the allocation and use of a temporary resource request identifier would similarly benefit from the teachings of the present invention. For example it may be useful in instances were the mobile subscriber or wireless communication device is involved in updating its synchronization relative to a target base station in connection with uploading or downloading data and managing the data's expected arrival times, where the request for resources includes and/or involves a request for synchronization, as well as instances when access to a target base station is being initiated or re-established.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method for allocating by a plurality of source base stations of a cellular wireless communication support infrastructure a temporary resource request identifier to a wireless communication device for accessing a target base station of the cellular wireless communication support infrastructure, the method comprising:

identifying a list of temporary resource request identifiers associated with the target base station for use by one or more wireless communication devices requesting resources from the target base station, wherein the list includes a subset of one or more part time temporary resource request identifiers whose respective assignment to a corresponding grouping of one or more source base stations at a particular time is rotated between more than one of the plurality of corresponding groupings of one or more source base stations and wherein the list additionally includes a subset of one or more full time temporary resource request identifiers that are respectively assigned to one of a plurality of corresponding grouping of one or more source base stations;

detecting a desire by a particular wireless communication device for resources from the target base station, while the particular wireless communication device is communicating with a particular source base station; and allocating a temporary resource request identifier, which is currently associated with the corresponding grouping of one or more source base stations including the particular source base station to the particular wireless communication device.

2. A method in accordance with claim 1, wherein when allocating one of any full time temporary resource request identifiers, or one of any part time temporary resource request identifiers, which are assigned to the corresponding grouping of one or more source base stations that include the particular source base station, allocating the any part time temporary resource request identifiers prior to allocating the any full time temporary resource request identifiers.

3. A method in accordance with claim 1, wherein the full time temporary resource request identifiers and part time temporary resource request identifiers, which are assigned to the corresponding grouping of one or more source base stations that include the particular source base station, are allocated to the wireless communication devices for which a desire for resources from the target base station has been detected in an order, based upon the length of time that the wireless communication devices for which a desire for resources from the target base station has been detected has been waiting for an allocation.

4. A method in accordance with claim 3, wherein the full time temporary resource request identifiers and part time temporary resource request identifiers, which are assigned to the corresponding grouping of one or more source base stations that include the particular source base station, are allocated first to the wireless communication devices for which a desire for resources from the target base station has been detected has been waiting the longest for an allocation.

5. A method in accordance with claim 4, wherein the any full time temporary resource request identifiers and any part time temporary resource request identifiers, which are assigned to the corresponding grouping of one or more source base stations that include the particular source base station, are allocated to the wireless communication devices for which a desire for resources from the target base station has been detected in an order, based upon the length of time that the wireless communication devices for which a desire for resources from the target base station has been detected has been waiting for an allocation;

wherein the any full time temporary resource request identifiers and any part time temporary resource request identifiers, which are assigned to the corresponding grouping of one or more source base stations that include the particular source base station, are allocated first to the wireless communication devices for which a desire for resources from the target base station has been detected has been waiting the longest for an allocation;

wherein upon allocation of all of the any full time temporary resource request identifiers and any part time temporary resource request identifiers, which are assigned to the corresponding grouping of one or more source base stations that include the particular source base station, the allocation of any further temporary resource request identifiers by the particular source base station for any wireless communication devices for which a desire for resources from the target base station has been detected and for which a temporary resource request identifier has not yet been assigned will be held over until a subsequent one of the plurality of predefined communication time intervals, unless the length of time that the wireless communication device for which a desire for resources from the target base station has been detected and for which a temporary resource request identifier has not yet been assigned has been waiting for an allocation exceeds a maximum allowable assignment delay;

wherein if the length of time that the wireless communication device for which a desire for resources from the target base station has been detected and for which a temporary resource request identifier has not yet been assigned has been waiting for an allocation exceeds a maximum allowable assignment delay, then a temporary resource request identifier, which is not assigned to the corresponding grouping of one or more source base stations that include the particular source base station will be assigned to the wireless communication device for which a desire for resources from the target base station has been detected for which a temporary resource request identifier has not yet been assigned and for which the length of time the wireless communication device has been waiting for an allocation exceeds a maximum allowable assignment delay.

6. A method in accordance with claim 5, wherein the temporary resource request identifiers, which are not assigned to the corresponding grouping of one or more source base stations that include the particular source base station are assigned to the wireless communication device for which a desire for resources from the target base station has been detected for which a temporary resource request identifier has not yet been assigned and for which the length of time the wireless communication device has been waiting for an allocation exceeds a maximum allowable assignment delay, in sequence from the list of temporary resource request identifiers associated with the target base station for use by one or more wireless communication devices requesting resources from the target base station starting from the first temporary resource request identifier in the list after the last one of the one or more full time temporary resource request identifiers, which are assigned to the corresponding grouping of one or more source base stations that include the particular source base station.

7. A method in accordance with claim 1, wherein the temporary resource request identifiers are assigned for one of a plurality of predefined communication time intervals.

8. A method in accordance with claim 7, wherein during each predefined communication time interval a source base station will separately sequentially allocate, each of any full time temporary resource request identifiers, which are assigned to the corresponding grouping of one or more source base stations that include the particular source base station, and any part time temporary resource request identifiers, which are currently assigned to the corresponding grouping of one or more source base stations that include the particular source base station.

9. A method in accordance with claim 8, wherein upon allocation of each of the any full time temporary resource request identifiers, which are assigned to the corresponding grouping of one or more source base stations that include the particular source base station, and the any part time temporary resource request identifiers, which are currently assigned to the corresponding grouping of one or more source base stations that include the particular source base station, sequentially allocating the next temporary resource request identifier associated with the target base station from the list of temporary resource request identifiers associated with the target base station for use by one or more wireless communication devices requesting resources from the target base station starting from the first temporary resource request identifier in the list after the last one of the one or more full time temporary resource request identifiers, which are assigned to the corresponding grouping of one or more source base stations that include the particular source base station, in response to any further detection of a desire by any further wireless communication devices for resources from the target base station, while the further wireless communication devices are communicating with the particular source base station.

10. A method in accordance with claim 7, wherein upon allocation of all of the any full time temporary resource request identifiers and any part time temporary resource request identifiers, which are assigned to the corresponding grouping of one or more source base stations that include the particular source base station, the allocation of any further temporary resource request identifiers by the particular source base station for any wireless communication devices for which a desire for resources from the target base station has been detected and for which a temporary resource request identifier has not yet been assigned will be held over until a subsequent one of the plurality of predefined communication time intervals.

11. A method for allocating by a plurality of source base stations of a cellular wireless communication support infrastructure a temporary resource request identifier to a wireless communication device for accessing a target base station of the cellular wireless communication support infrastructure, the method comprising:

detecting a desire from one or more wireless communication devices for resources from the target base station, while the one or more wireless communication devices are communicating with a particular source base station;

determining the length of time that each of the wireless communication devices for which a desire for resources from the target base station has been detected has been waiting for an allocation;

based upon the length of time that each of the wireless communication devices for which a desire for resources from the target base station has been detected has been waiting for an allocation, assigning one of one or more temporary resource identifiers from a list of temporary resource identifiers identified as being available for assignment by a particular source base station to each of a number of the wireless communication devices for which a desire for resources from the target base station has been detected up to a number of wireless communication devices equal to the number of temporary resource identifiers in the list of temporary resource identifiers identified as being available for assignment by a particular source base station, in each of a plurality of predefined communication intervals;

wherein if the number of the wireless communication devices for which a desire for resources from the target base station has been detected exceeds the number of temporary resource identifiers in the list of temporary resource identifiers identified as being available for assignment by a particular source base station, then holding over for assignment in a subsequent predefined communication interval a number of wireless communication devices equal to the amount that the number of the wireless communication devices for which a desire for resources from the target base station has been detected exceeds the number of temporary resource identifiers in the list of temporary resource identifiers identified as being available for assignment by a particular source base station, unless there are more wireless communication devices for which a desire for resources from the target base station has been detected for which the length of time that each of the wireless communication devices for which a desire for resources from the target base station has been detected has been waiting for an allocation exceeds a maximum allowable assignment delay, and if so respectively assigning each one of the one or more temporary resource identifiers from the list of temporary resource identifiers to a corresponding one of the wireless communication devices for which a desire for resources from the target base station has been detected for which the length of time that each of the wireless communication devices for which a desire for resources from the target base station has been detected has been waiting for an allocation exceeds a maximum allowable assignment delay, and sequentially assigning a temporary resource request identifier which is not assigned to the source base station until all wireless communication devices for which a desire for resources from the target base station has been detected for which the length of time that each of the wireless communication devices for which a desire for resources from the target base station has been detected has been waiting for an allocation exceeds a maximum allowable assignment delay have been assigned a temporary resource identifier.

* * * * *